United States Patent
Gioquindo et al.

(10) Patent No.: US 6,334,154 B1
(45) Date of Patent: *Dec. 25, 2001

(54) ARTICLE OF MANUFACTURE FOR COMMUNICATIONS OF MULTIPLE PARTITIONS EMPLOYING HOST-NETWORK INTERFACE, AND ADDRESS RESOLUTION PROTOCOL FOR CONSTRUCTING DATA FRAME FORMAT ACCORDING TO CLIENT FORMAT

(75) Inventors: Paul M. Gioquindo; Chin Lee, both of Poughkeepsie; Bruce H. Ratcliff, Red Hook; Stephen R. Valley, Valatie, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/152,771

(22) Filed: Sep. 14, 1998

(51) Int. Cl.[7] .......................... G06F 15/173; G06F 15/16
(52) U.S. Cl. ........................ 709/236; 709/245; 709/250
(58) Field of Search .................................. 709/245, 246, 709/249, 250, 228, 236, 218, 243, 252; 370/466, 467, 401

(56) References Cited

U.S. PATENT DOCUMENTS

| | | | |
|---|---|---|---|
| 5,379,296 | * | 1/1995 | Johnson et al. ........................ 370/402 |
| 5,560,038 | * | 9/1996 | Haddock ................................ 709/236 |
| 5,596,723 | * | 1/1997 | Romohr ................................. 709/222 |

(List continued on next page.)

OTHER PUBLICATIONS

Comer, "Internetworking with TCP/IP", vol. 1, Printice Hall, 3 pages, 1995.*
C. Perkins, RFC2003, IP encapsulation within IP, C.Perkins, http://fc.fh–kolen.de, 14 pages, Oct. 1996.*
Garrett et al., RFC1433, Directed ARP, http://rfc.fh–koeln.de, 18 pages, Mar. 1993.*
Renwick et al., RFC1374, IP and ARP on HIPPI, http://rfc.fh–kolen.de, 42 pages, Oct. 1992.*
Postel et al., RFC1042, http://rfc.fh–kolen.de, 15 pages, Feb. 1988.*
Postel, rfc0895, http:/rfc.fh–kolen.de, 4 pages, Apr. 1984.*
Hornig, rfc0894, http://rfc.fh–kolen.de, 4 pages, Apr. 1984.*
Plummer, rfc0826, http://rfc.fh–kelon.de, 9 pages, Nov. 1982.*

*Primary Examiner*—Le Hien Luu
*Assistant Examiner*—Bunjob Jaroenchonwanit
(74) *Attorney, Agent, or Firm*—Lily Neff, Esq.; Floyd A. Gonzalez, Esq.; Heslin Rothenberg Farley & Mesiti P.C.

(57) ABSTRACT

In a mainframe class data processing system having multiple logical partitions and a port to a network, a host-network interface is established for reducing network overhead at the multiple partitions. The host-network interface includes, for example, a host channel connection coupling the multiple partitions of the host system to a communications adapter having a network device driver for each network coupled to the adapter. The adapter also includes an address resolution protocol (ARP) cache designed to hold predetermined media headers for the clients coupled to the network(s) for use in forwarding an internet protocol (IP) datagram across the network to one of the clients from a partition of the host system. If not predetermined, the adapter is provided with a capability to dynamically determine the needed media header for transmission of the IP datagram across the network to the client. In Ethernet format, this dynamically determining includes forwarding an Ethernet 802.3 ARP request and an Ethernet DIX ARP request from the IP datagram. Provision is also made for partition-to-partition communication of IP datagrams by storing IP addresses of the logical partitions as HOME addresses in the ARP cache of the adapter.

14 Claims, 9 Drawing Sheets

U.S. PATENT DOCUMENTS

| | | | | |
|---|---|---|---|---|
| 5,623,605 | * | 4/1997 | Keshav et al. | 395/200.17 |
| 5,734,865 | * | 3/1998 | Yu | 395/500 |
| 5,740,438 | | 4/1998 | Ratcliff et al. | 395/680 |
| 5,751,971 | * | 5/1998 | Dobbins et al. | 709/238 |
| 5,758,070 | * | 5/1998 | Lawrence | 709/220 |
| 5,835,720 | * | 11/1998 | Nelson et al. | 709/224 |
| 5,835,725 | * | 11/1998 | Chiang et al. | 709/228 |
| 5,850,526 | * | 12/1998 | Chou | 709/247 |
| 5,959,990 | * | 9/1999 | Frantz et al. | 370/392 |
| 6,016,388 | * | 1/2000 | Dillon | 709/242 |
| 6,018,767 | * | 1/2000 | Fijolek et al. | 709/218 |
| 6,032,197 | * | 2/2000 | Birdwell et al. | 709/247 |
| 6,047,325 | * | 4/2000 | Jain et al. | 709/227 |
| 6,049,826 | * | 4/2000 | Beser | 709/222 |
| 6,115,365 | * | 9/2000 | Vig | 370/401 |
| 6,128,294 | * | 10/2000 | Oura et al. | 370/389 |

* cited by examiner fig. 1
(PRIOR ART)

ARTICLE OF MANUFACTURE FOR COMMUNICATIONS OF MULTIPLE PARTITIONS EMPLOYING HOST-NETWORK INTERFACE, AND ADDRESS RESOLUTION PROTOCOL FOR CONSTRUCTING DATA FRAME FORMAT ACCORDING TO CLIENT FORMAT

CROSS-REFERENCE TO RELATED APPPLICATIONS

This application contains subject matter which is related to the subject matter of the following applications, each of which is assigned to the same assignee as this application and filed on the same day as this application. Each of the below-listed applications is hereby incorporated herein by reference in its entirety:

"METHOD FOR NETWORK COMMUNICATIONS OF MULTIPLE PARTITIONS EMPLOYING HOST-NETWORK INTERFACE," by Gioquindo et al., Ser. No. 09/152,369

"SYSTEM FOR NETWORK COMMUNICATIONS OF MULTIPLE PARTITIONS EMPLOYING HOST-NETWORK INTERFACE," by Gioquindo et al., Ser. No. 09/152,370

TECHNICAL FIELD

The present invention relates in general to network communications of processing systems. More particularly, the invention relates to techniques for effecting communications between a network and multiple partitions of a data processing system employing a host-network interface.

BACKGROUND OF THE INVENTION

Mainframe class data processing systems have hardware and software facilities that enable partitioning thereof. Such processing systems may be subdivided into multiple partitions whereby a user of a partition, or software executing in a partition, has the impression that the processing system is exclusively used by that application. Each partition has the appearance of being a separate and distinct processing system and may even run its own multi-tasking and multi-user operating systems independent from each other partition. An IBM Enterprise Systems Architecture ("ESA")/390 Mainframe Computer is an example of one such partition-able mainframe class data processing system. Partitioning thereof is described in, for example, various publications by International Business Machines Corporation, including "IBM ESA/390 Principles of Operation", IBM Publication No. SA22-7201-02, December 1994, and in the "IBM Enterprise System/9000 Processor Resource/Systems Manager Planning Guide", IBM Publication No. GA22-7123-11 (April 1994), which are both hereby incorporated herein by reference in their entirety.

Figure 1:
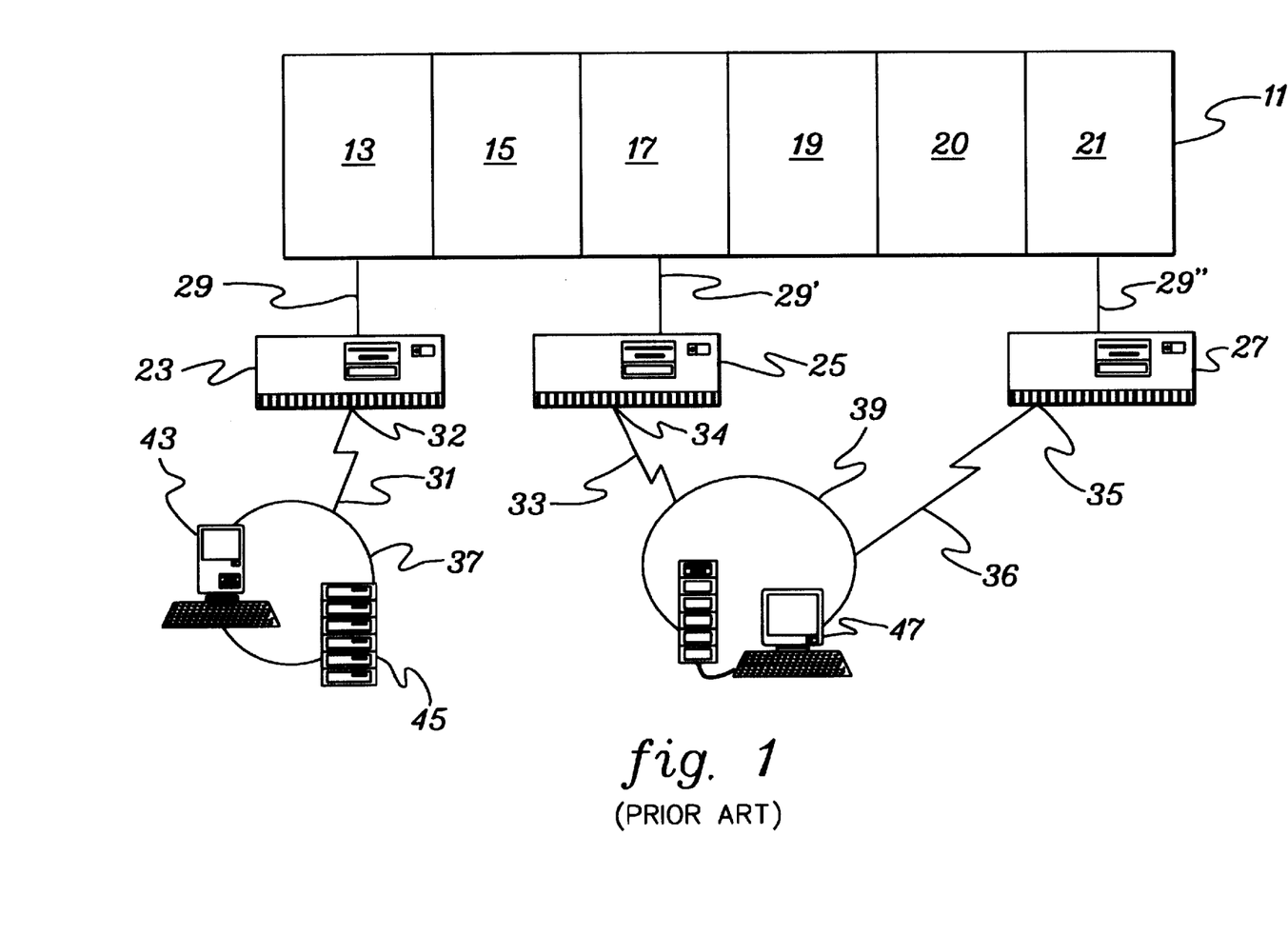
FIG. 1 is a system diagram of a conventional network connected partitionable mainframe class data processing system.

Software executing in individual partitions within the mainframe class data processing system may require a network connection such as a local area network ("LAN") connection or a wide area network ("WAN") connection. This may be used to facilitate connectivity to users, or to application programs used in, for example, a client-server processing environment. Shown in FIG. 1 is a conventional configuration used to connect individual partitions, including the software running therein, to a LAN. The configuration includes a processing system 11 that has partitions 13, 15, 17, 19, 20 and 21.

Network connectivity for each partition of system 11 of FIG. 1 is achieved using separate network interfaces for each partition. For example, partition 13 is conventionally connected through channel connection 29 to an IBM 3172 Interconnect Controller 23 (with 8232 Channel Interface Attachment) that has, for example, a token ring or Ethernet LAN port 32 attached to LAN 37 thereby providing LAN connection 31. Network connectivity is accordingly directly provided between partition 13 and computers 43 and 45 on LAN 37 through the IBM 3172 23. However, according to conventional techniques, this configuration has no other direct logical or physical connections from any of the other partitions to LAN 37. To further note, each application within partition 23 must communicate with a different network port on IBM 3172 23. The IBM 3172 (having internal 8232 Channel Interface Attachment), is described in a publication entitled "8232 LAN Channel Station", Apr. 15, 1998, IBM Publication No. ZZ25-8577-0, that is incorporated herein by reference in its entirety.

The conventional software executing on IBM 3172s restricts direct logical connectivity to being between a single partition and its corresponding LAN. Thus, to facilitate direct connectivity from a computer 47 on a LAN 39 to both partition 17 and 21, multiple IBM 3172s would traditionally be used. Partition 17 is coupled to LAN 39 via channel connection 29', IBM 3172 25 and LAN port 34 thereby establishing LAN connection 33. Similarly, partition 21 is coupled to LAN 39 via channel connection 29", IBM 3172 27, and LAN port 35 thereby establishing LAN connection 36.

The conventional host-to-network connectivity techniques discussed above have several limitations. Connectivity between a single network (i.e., LAN or WAN) and multiple partitions require the use of multiple interfaces therebetween such as, for example, multiple IBM 3172s. Further, each application executing in a single partition must use a different port on the IBM 3172 corresponding to the single partition.

An enhanced network interface for a mainframe class data processing system having multiple partitions and a port to a network is described in commonly assigned U.S. Pat. No. 5,740,438, which is hereby incorporated herein by reference in its entirety. Briefly summarized, this patent describes establishing a table which defines communications paths between the port to the network and at least two partitions of the multiple partitions. More specifically, each partition has at least one application executing therewithin and the communications paths are defined thereto. Data frames are passed between the network and the applications within the partitions through the port to the network and along the communications paths defined in the table such that the network communications is effected.

Figure 2:
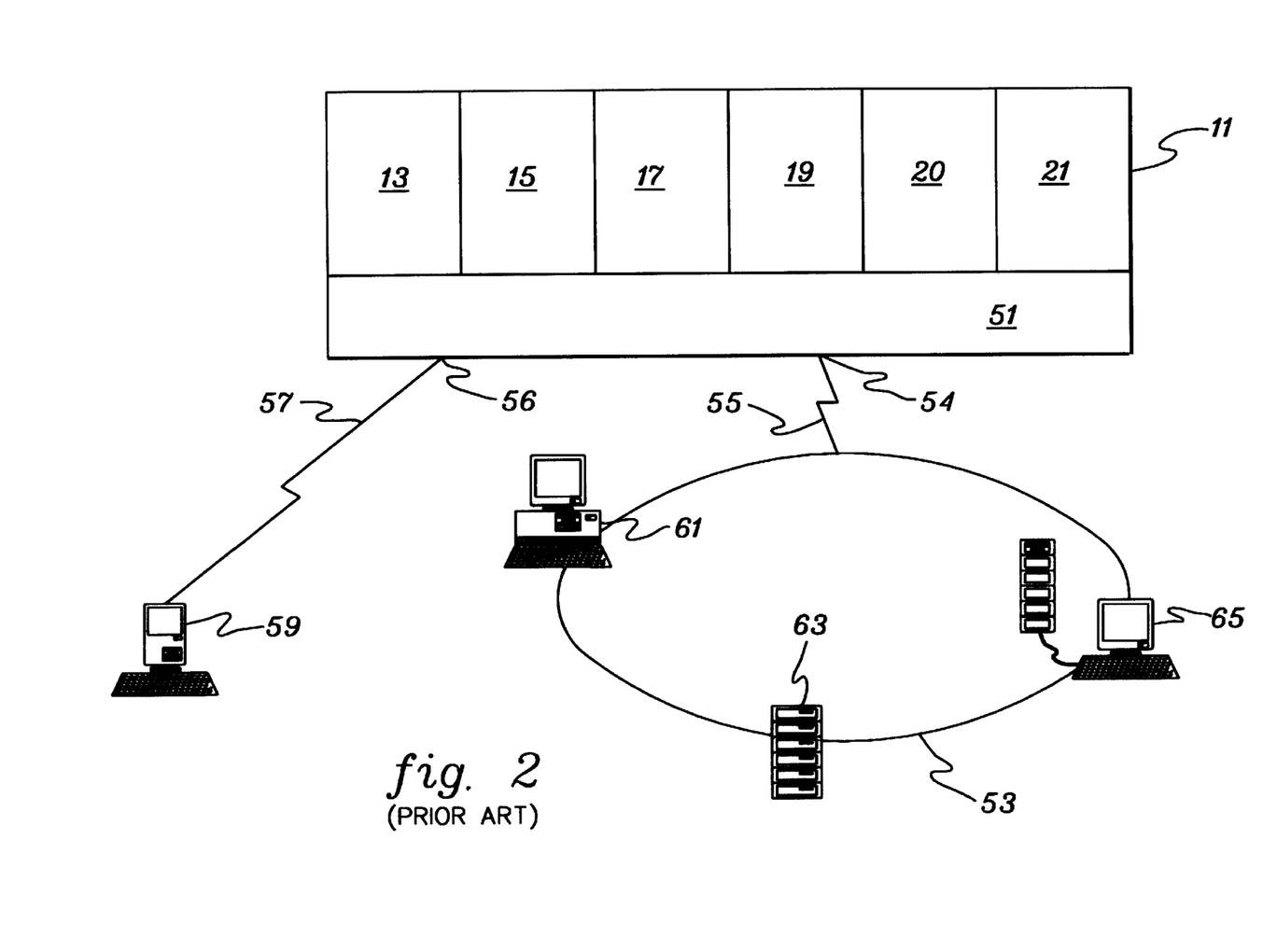
FIG. 2 is a system diagram of an alternate embodiment of a network connected partitionable mainframe class data processing system.

One embodiment of the network interface approach of U.S. Pat. No. 5,740,438 is depicted in FIG. 2. Shown is a partitionable mainframe class data processing system 11 (e.g., an IBM Enterprise System/9000) having an integral host-to-network interface ("HNI") 51 that facilitates a LAN connection 55 from multiple partitions 13, 15, 17, 19, 20 and 21 to LAN 53 through LAN port 54. Each application in each partition may directly communicate with computers 61, 63 and 65 on LAN 53 through the single host-to-network interface 51 and single LAN port 54. The LAN shown is a token ring LAN; however, the system is equally applicable to other types of LANs such as, for example, Ethernet and Fiber Distributed Data Interface ("FDDI"). Further, the host-to-network interface may support multiple network connections by way of multiple network ports. For example, a WAN connection 57 comprising, for example, a Peer-to-Peer Protocol ("PPP") connection may be established to a computer 59 through WAN port 56. Any mix of LAN and WAN connections among multiple ports of host-to-network interface 51 is possible.

The host-to-network connectivity techniques described above have certain limitations, particularly in an Ethernet environment where two different frame types are possible, i.e., Ethernet DIX and Ethernet 802.3. For client/server systems, Transmission Control Protocol (TCP)/Internet Protocol (IP) has become the leading protocol for network communications. Using Ethernet, when a client application running over TCP/IP wants to communicate with a server application, the application must specify one of the two existing Ethernet frame formats. The frame format must also be known by the server machine in order for the TCP/IP connection to be established and any data transfer to occur. Conventionally, in order to make sure that the client and server communicate using the same Ethernet frame formats, both the client and server must specify the specific frame format to be used in their appropriate configuration files. If the configuration files do not match, then the client/server application will not work properly.

The most common server TCP/IP environment today has the complete TCP/IP functionality on one platform. For example, reference "TCP/IP Tutorial and Technical Overview," IBM Document No. GG24-3376-03 (December 1992). In this environment, one device driver exists in each partition for each LAN connection. Each device driver can specify a different Ethernet frame format, but will not support both frame formats. Thus, a different device driver is used for each of the two frame formats. In operation, a dedicated device driver of a partition of the host system takes care of providing both channel headers and media or LAN headers necessary for transmission of an IP packet across the LAN to a client coupled thereto. Again, however, this dedicated device driver is configured to function with one particular type of LAN, and with respect to Ethernet, one particular frame format.

With the above as background, the present invention is directed to enhancements to the state-of-the-art of network communications of multiple partitions employing a host-network interface.

Disclosure of the Invention

Briefly summarized, the present invention comprises in a first aspect an article of manufacture which includes at least one computer usable medium having computer readable program code means embodied therein for causing network communications in a mainframe class data processing system having multiple partitions and a port to a network. The computer readable program code means in the article of manufacture includes computer readable program code means for causing a computer to effect: receiving at a host-network interface an internet protocol (IP) datagram from one partition of the multiple partitions, the IP datagram to be routed to a client coupled to the network; constructing a first address resolution protocol (ARP) request in a first frame format from the IP datagram and a second ARP request in a second frame format from the IP datagram; and sending both the first ARP request and the second ARP request across the network to the client.

In another aspect, the invention comprises an article of manufacture which includes at least one computer usable medium having computer readable program code means embodied therein for causing network communications in a mainframe class data processing system having multiple partitions and a port to a network. The computer readable program code means in the article of manufacture includes computer readable program code means for causing a computer to effect: receiving at a host-network interface an internet protocol (IP) datagram from one partition of the multiple partitions, the IP datagram to be routed to a client coupled to the network and having no media header specified; and dynamically determining at the host-network interface a media header for use in communicating the IP datagram to the client coupled to the network.

In still another aspect, the invention comprises an article of manufacture which includes at least one computer usable medium having computer readable program code means embodied therein for causing network communications in a mainframe class data processing system having multiple partitions and a port to a network. The computer readable program code means in the article of manufacture includes computer readable program code means for causing a computer to effect: broadcasting an address resolution protocol (ARP) request across the network from a host-network interface; receiving a response ARP packet from a client coupled to the network responsive to the broadcasting, the response ARP packet including a media header defining a data format to use for an internet protocol session with the client; and saving the media header at the host-network interface for appending to an IP datagram from a partition of the multiple partitions when the IP datagram is to be routed to the client.

In a further aspect, the invention comprises an article of manufacture which includes at least one computer usable medium having computer readable program code means embodied therein for causing network communications in a mainframe class data processing system having multiple partitions and a port to a network. The computer readable program code means in the article of manufacture includes computer readable program code means for causing a computer to effect: saving at a host-network interface an internet protocol (IP) address for at least one of the multiple partitions of the mainframe class data processing system; generating an IP datagram at a first partition of the multiple partitions to be forwarded to a second partition of the multiple partitions using a destination IP address; and determining whether the destination IP address for the IP datagram comprises a saved IP address at the host-network interface of the at least one partition of the mainframe class data processing system, and if so, forwarding the IP datagram directly from the first partition to the second partition without employing the network.

In a still further aspect, the invention comprises an article of manufacture which includes at least one computer usable medium having computer readable program code means embodied therein for causing network communications in a mainframe class data processing system having multiple partitions and a port to a network. The computer readable program code means in the article of manufacture includes computer readable program code means for causing a computer to effect: generating an internet protocol (IP) datagram at one partition of the multiple partitions, the IP datagram being generated without specifying a media header for use in forwarding the IP datagram across the network; transferring the IP datagram to a host-network interface for routing to a client coupled to the network; and appending a predetermined media header to the IP datagram at the host-network interface for forwarding the IP datagram across the network to the client.

Network communications in accordance with the principles of the present invention provides numerous advantages over the existing art for a mainframe class data processing system having a port coupled to a network. For example, reduced configuration information is required at the host system since the user application does not have to specify the network type in the host configuration. In one aspect, this is accomplished by providing a technique for dynamically determining an Ethernet frame format at the communications adapter of the host-network interface coupling the host system to the network. Further, in accordance with this invention, only one common non-network specific channel device driver is needed at each logical partition of the host system, and one network, e.g., LAN, device driver at each port of the network adapter. Less internet protocol addresses are therefore needed for host connections to the network. Advantageously, one single IP address within a partition can be used to communicate with any number of different networks, e.g., token ring, Ethernet DIX or Ethernet 802.3. This contrasts with existing configurations, wherein for each unique network type, and for each Ethernet frame type, a different IP address must be specified within the partition. Further, partition-to-partition traffic is facilitated herein without requiring a network connection to route an internet protocol (IP) datagram from a first logical partition to a second logical partition of the host data processing system.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Figure 3:
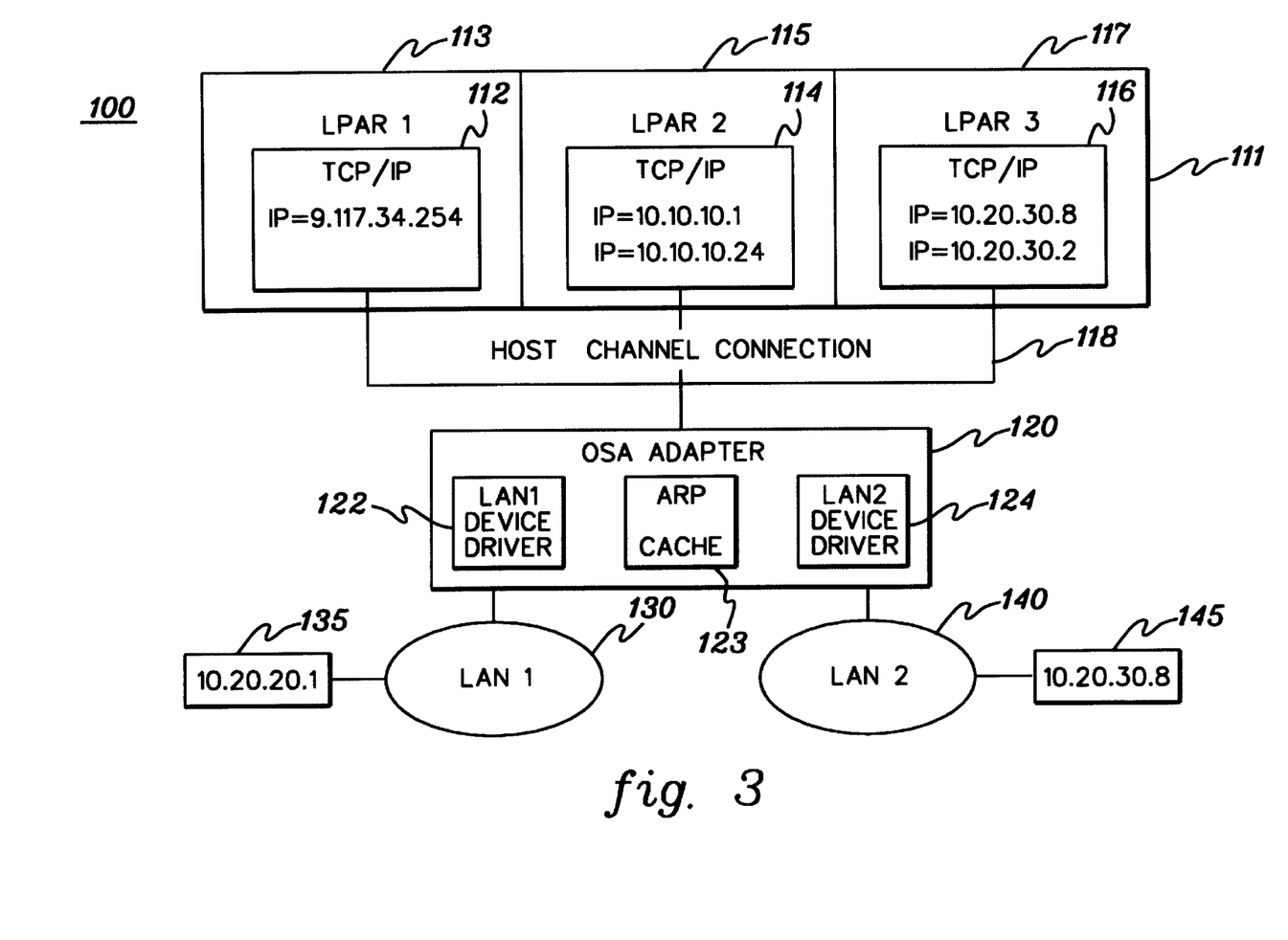
FIG. 3 is a system diagram of one embodiment of a network connected partitionable mainframe class data processing system pursuant to the present invention.

As noted, a common communications protocol for the mainframe environment today is the Transmission Control Protocol/Internet Protocol (TCP/IP). TCP/IP communications is described in, for example, the above-noted document entitled "TCP/IP Tutorial and Technical Overview," IBM Document No. GG24-3376-03, published December, 1992, which is hereby incorporated herein by reference in its entirety. The present invention employs, e.g., TCP/IP communications with certain TCP/IP functionality being migrated from the host system to a second platform, herein referred to as the host-network interface. FIG. 3 depicts one embodiment of a communications network 100 in accordance with the present invention wherein an IBM S/390 host system 111 is coupled to multiple local area networks across a host-network interface which comprises a host channel connection 118 and a communications adapter, such as an IBM Open Systems Adapter (OSA) 120. The OSA 120 may be platform channel attached to or integrated with the mainframe environment. In the OSA environment, the TCP/IP address resolution protocol (ARP) function has been migrated to the OSA platform 120.

In accordance with the present invention, the OSA adapter has the capability of supporting any number of different TCP/IP connections through a common network device driver, such as LAN 1 device driver 122 and LAN 2 device driver 124. Further, pursuant to this invention, the HOST applications are no longer required to know anything about the LAN or wide area network (WAN) media over which they are communicating. Since only one channel device driver per network is to be employed, provision is made herein for the network device driver to support both Ethernet DIX and Ethernet 802.3 formats. In addition, the OSA has the capability to dynamically determine which Ethernet frame type a particular client platform supports for a current connection. Each of these aspects of the invention, as well as others, is described in detail hereinbelow.

FIG. 3 shows three separate HOST logical partitions (LPARs) or partitions. As is well known, each LPAR functions as its own separate entity, with each logical partition (LPAR) of the host system 111 being viewed as a completely separate entity. The TCP/IP box within each LPAR defines a unique TCP/IP stack 112, 114, 116, which can function independently of the others. The IP fields are the unique IP addresses defined for each TCP/IP stack. A TCP/IP stack can have one or more IP addresses defined.

Each logical partition LPAR 1 113, LPAR 2 115, LPAR 3 117, couples through a Host Channel Connection 118 to a communications adapter 120, such as IBM's Open Systems Adapter (OSA). The OSA adapter, which has a connection to each of the TCP/IP stacks, is an integrated channel attached LAN adapter which does not contain its own TCP/IP stack. The Host Channel Connection 118 comprises as one example an IBM Enterprise System Connection ("ESCON") channel connector. The LAN device drivers 122, 124 and the Address Resolution Protocol cache 123 are contained in the OSA adapter 120. This is different from other channel attached adapters which do not contain the IP functionality. For background on an Address Resolution Protocol (ARP) cache or table, reference a textbook by W. Richard Stevens entitled *TCP/IP Illustrated*, published by Addison-Wesley, Volume 1 (1994), the entirety of which is hereby incorporated herein by reference.

Previously, each logical partition was required to contain its own LAN device driver. Pursuant to the present invention, however, multiple logical partitions are shown in FIG. 3 as sharing a common network device driver 122 or 124 for accessing network 130, 140, respectively, coupled to the host system 111. By way of example, OSA adapter 120 is shown connected to two different LANs, i.e., LAN 1 130 and LAN 2 140. These LANs can be different media types, e.g., Fiber Distributed Data Interface ("FDDI"), token ring, or Ethernet. Further, each LAN 130, 140 includes a representative client platform 135 & 145. The numbers depicted in the client platforms are representative of IP addresses used in accessing the particular platforms.

Figure 4A:
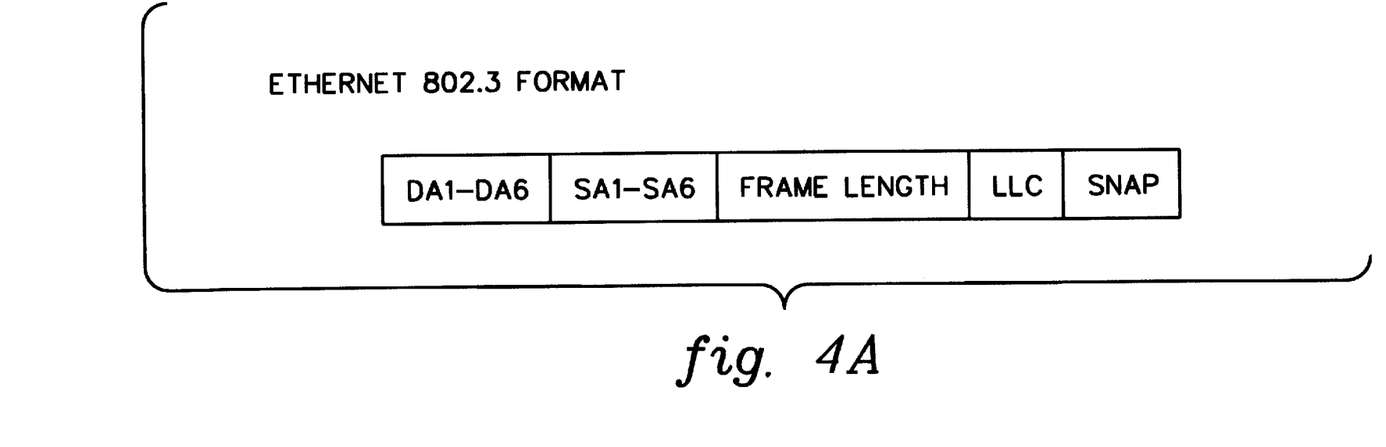
FIGS. 4a & 4b are simplified block diagrams of the two Ethernet frame formats in common use.
Figure 4B:
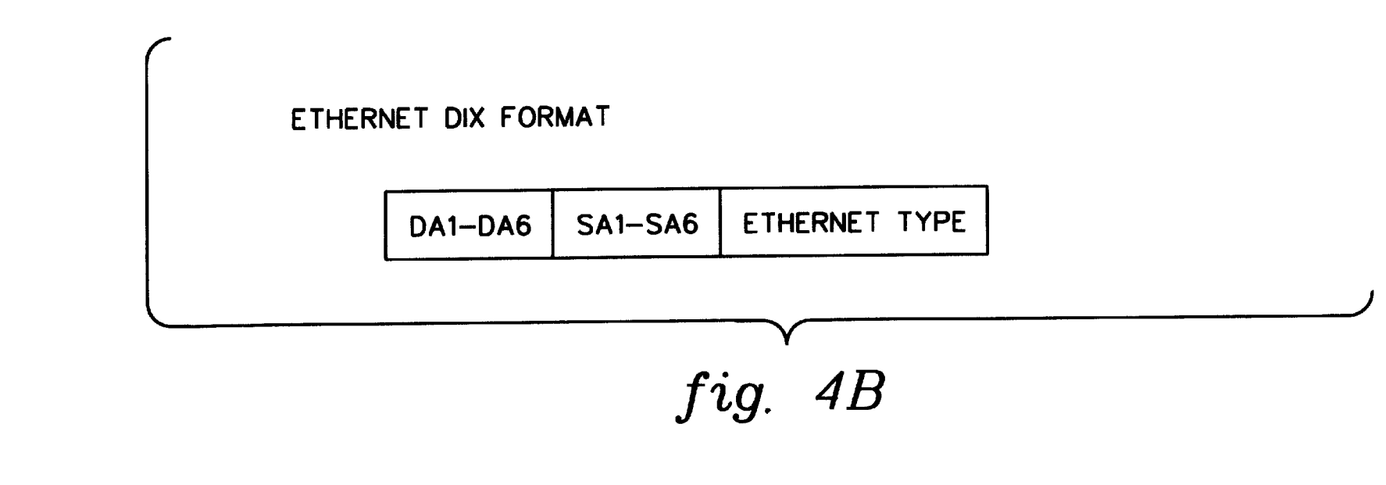

As briefly noted above, one aspect of this invention comprises providing the host-network interface with the capability to dynamically determine or predetermine the particular Ethernet frame format needed for a LAN device driver, for example, LAN 1 device driver 122, to communicate across the network with a client 135 coupled to the network. In an Ethernet environment, there are two different frame formats in common use, i.e., Ethernet 802.3 and Ethernet DIX, for client platforms which can co-exist on the Ethernet network. FIGS. 4a & 4b depict the fields of the Ethernet 802.3 and Ethernet DIX formats, respectively. A description of these fields is set forth below:

DA1–DA6—this field is the destination MAC address which comprises the Media Access Control address of a port on the destination LAN adapter. By way of example, the destination address is six bytes in length.

SA1–SA6—this is the source MAC address which comprises the media access control address of a port on the sending LAN adapter. In this example, the source address is six bytes.

Frame length—this is the length of an Ethernet frame, including length of LLC, SNAP and IP datagram. In one example, the frame length is two bytes.

LLC—this field comprises the Logical Link Control field and contains, for example, protocol information. Protocol is the networking protocol that the application is using. Examples of networking protocols include TCP/IP, "NETBIOS," "IPX" (used in "Novell" networks) and Systems Network Architecture ("SNA"). The LLC field in Ethernet 802.3 format may comprise three bytes.

SNAP—identifies the Sub-Network Access Protocol within the LAN packet. In one example, the SNAP header may be five bytes.

Ethernet Type—identifies the protocol of the data that follows the Ethernet type in the frame. The Ethernet type of Ethernet DIX format is two bytes in length.

MAC—this is the Media Access Control field which contains, for example, broadcast indications and other LAN specific information.

To eliminate from the host the conventional configuration information otherwise needed for each IP session to identify the Ethernet frame type used between a client/server application, the present invention implements a technique which dynamically solicits the client platform to determine which Ethernet frame type is being used. To accomplish this, the OSA adapter implements the following:

When an IP datagram is received from a host partition which is to be routed to a new Ethernet client platform, two separate ARP packets are constructed. A first ARP packet is constructed using the Ethernet a DIX frame format and a second ARP packet is constructed using the Ethernet 802.3 format. Both frame formats are then broadcast across the network.

The client platform only responds to the ARP request which has the proper frame format. The other ARP will be dropped by the destination client platform upon its receipt.

When the client's ARP response is received back at the source system, its OSA adapter will know which frame format to use for the pending or future IP session(s) with that client.

Advantageously, employing the above concept results in less configuration information being needed at the host system. That is, the user application does not have to specify the LAN type in its host configuration.

Along with dynamically identifying the Ethernet frame format being used by a client machine, the present invention also includes storing media headers in the ARP table (or ARP cache) employed by the communications adapter. (As used herein, a "media header" refers to the MAC header, and is also referred to as a LAN header or WAN header.) For example, upon receipt of an ARP response from a client to a broadcast ARP request, the LAN header which defines the Ethernet frame format of the client machine is obtained from the response and stored into the ARP table in a manner which will be straightforward to one of ordinary skill in the art. The ARP table will thus contain two headers, one for ARP packets and one for IP packets. For Ethernet 802.3 headers, the entire MAC/LLC/SNAP header is stored in the ARP table. For Ethernet DIX, only the MAC header is needed. For a client which supports both Ethernet frame formats, the frame format in the first response from the client received at the OSA adapter may be used.

By storing the media header in the ARP table, the OSA adapter can then subsequently append this header to every IP datagram being sent to that particular client platform without having to construct a new media header each time. For Ethernet DIX packets, all the fields in the LAN header are constant, while for Ethernet 802.3, all the fields are constant except for the Frame Length field. This field must be changed to the packet length for each jacket transmitted.

Further, media headers can be predetermined by configuring the communications adapter to monitor ARP requests received from the network. Each incoming request will also identify the Ethernet frame type being used by the source client. From such a request, the LAN headers can be obtained and pre-stored in the ARP cache for future use with an IP request destined for that client platform as described above. Advantageously, by so pre-storing the LAN headers, the header does not have to be constructed for each IP datagram being transmitted from the adapter and the host system is freed of any responsibility for designating a client's Ethernet frame format.

Figure 5:
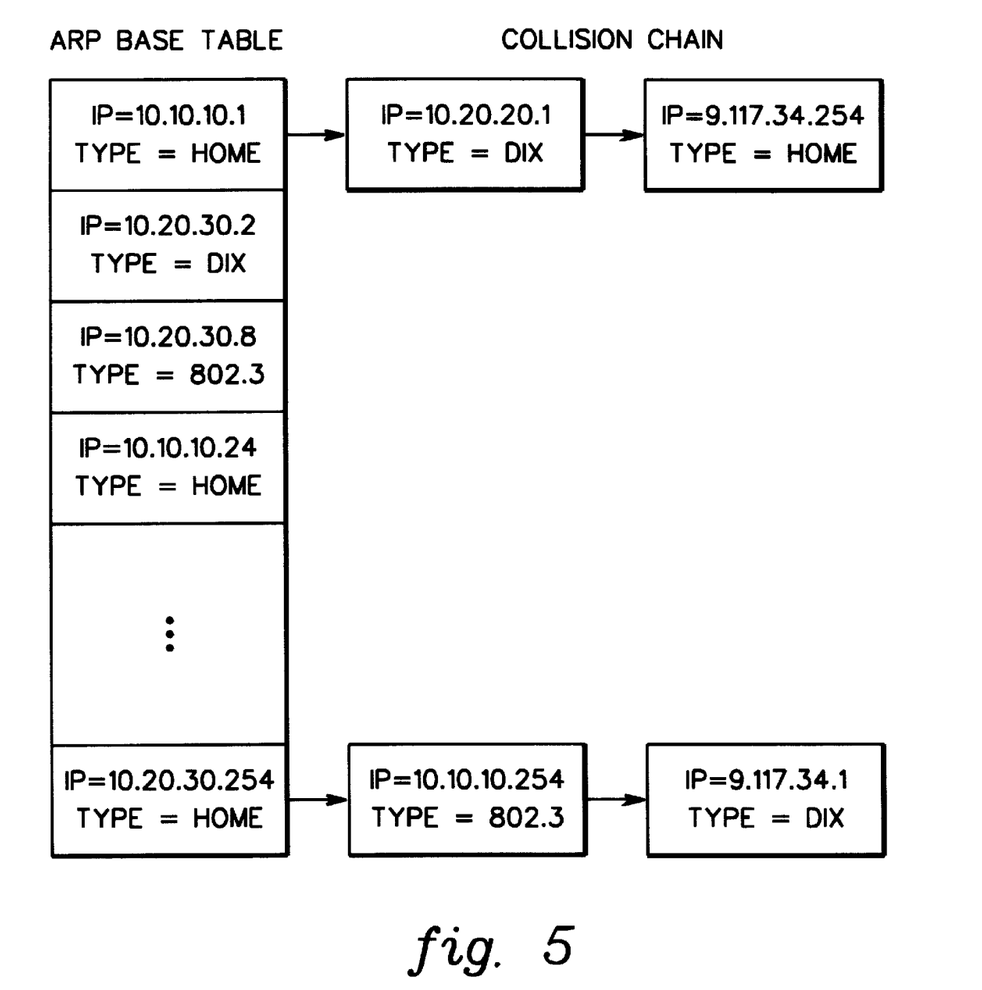
FIG. 5 depicts one embodiment of an Address Resolution Protocol (ARP) cache implemented within a host-network interface in accordance with the present invention.

Another aspect of the present invention comprises designating and saving "HOME" IP addresses within the communications adapter, e.g., within the ARP cache. FIG. 5 presents an example of the possible formats of the ARP entries on an OSA adapter in accordance with one embodiment of the invention. The figure depicts two tables, namely, an ARP Base Table and an ARP Collision Chain. To find a proper entry in the OSA ARP table, an IP address is traditionally first hashed to compute a one byte index into the ARP Base Table, which may by way of example comprise 256 bytes. Since it is possible for two IP addresses to "hash" to the same index, the ARP Collision Table is needed to chain these additional entries to the ARP Base Table. The IP numbers in the two tables comprise examples of IP addresses for the application used by the particular networking protocol as will be apparent to one of ordinary skill in the art. The examples agree in part with the IP addresses provided in FIG. 3.

The information in the ARP tables is preferably obtained from the TCP/IP stacks at initialization time and from the LAN as ARP requests/responses received from the network. At initialization time, each Host TCP/IP stack is configured to register its HOME IP addresses with the OSA adapter in a manner apparent to one skilled in the art. The "HOME" addresses are those which are recognized as local IP addresses by the specific stack. These entities are marked as HOME entries in the ARP cache. The entries are unique from the ARP entries for the LAN because they do not contain the specific LAN frame type which is to be used in transmitting a packet. If needed, the frame format for these entries is dynamically determined as described above by the client or server in the network which sends packets to the OSA adapter.

The HOME IP addresses mark the IP addresses to which OSA will respond when receiving an ARP request from the LAN. The format of the ARP response which OSA returns is the same as the format of the ARP request which OSA receives. The entire MAC header used to send back an ARP response is thus also saved in the ARP tables on the OSA adapter. This MAC header is then appended to any IP datagrams received from the Host which are destined for the matching IP address.

The HOME entries serve another purpose. In accordance with a further aspect of the invention, these entries are preferably used to route packets from a first logical partition (LPAR) to a second LPAR of the host system without going onto a network. When a packet is received from the Host, the destination IP address is "looked up" in the ARP tables of the host-network interface. If an entry is found and it is marked as a HOME entry, then the IP packet is routed directly to the LPAR owning that address. Since the packet is not sent out onto a network, no media or network header needs to be constructed.

Figure 6:
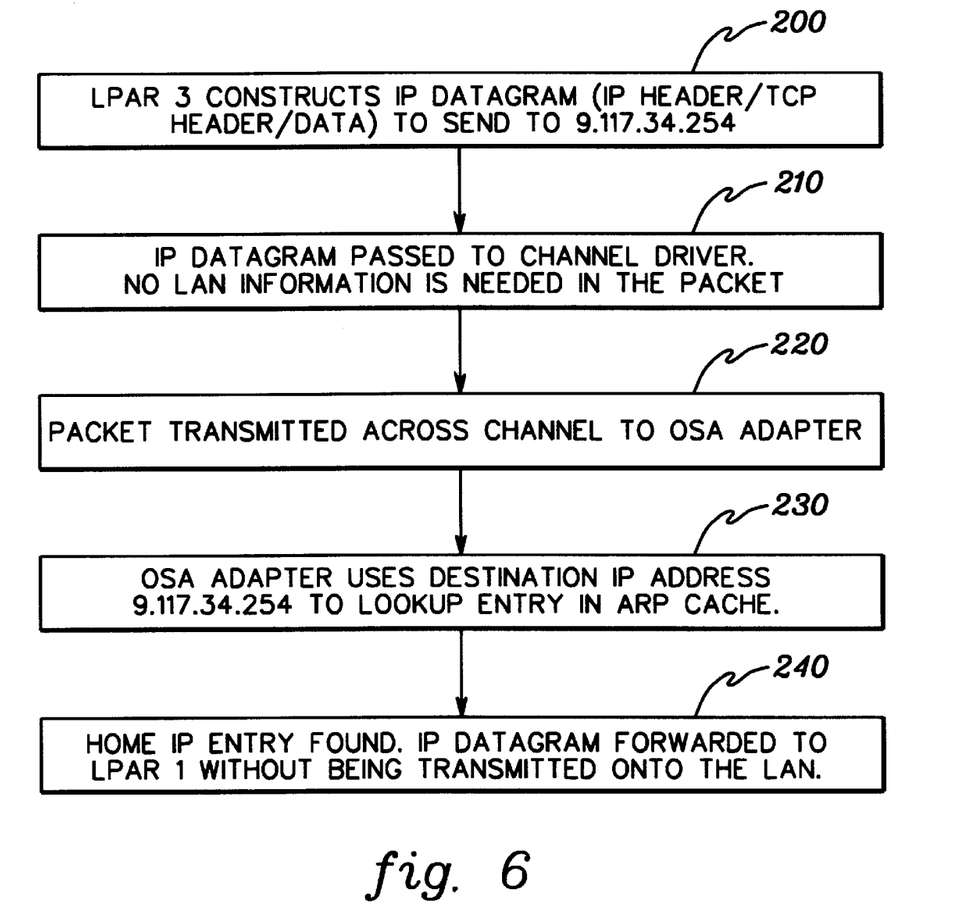
FIG. 6 is a flow diagram of communications in accordance with the present invention between a first partition and a second partition in a common mainframe class data processing system.

FIG. 6 depicts one embodiment of LPAR to LPAR communications in accordance with this aspect of the invention. In this example, a logical partition, LPAR 3, is assumed to construct an IP datagram which includes an IP header, a TCP header and data, for sending to an IP address 200, which is assumed to comprise address 9.117.34.254 (see FIGS. 3 & 5). The IP datagram is then passed to, e.g., an IBM ESCON channel driver within host channel connection 118 (FIG. 3) of the host-network interface, and no LAN information is provided by the LPAR in the packet 210. The packet is transmitted across the channel to, e.g., an OSA adapter 220 and the OSA adapter uses the destination IP address 9.117.34.254 to look up the entry in the ARP cache 230. As shown in FIG. 5, this particular IP address is designated in the collision chain as a HOME type IP address. Since a HOME IP entry is found, the IP datagram is forwarded directly to LPAR 1 from LPAR 3 without being transmitted out onto a network 240.

Packets for which a LAN entry is found are necessarily sent onto the appropriate LAN. In this example, a "LAN entry" comprises a saved IP address with a format type of Ethernet DIX or Ethernet 802.3 (see FIG. 5). For Ethernet DIX packets, the exact media or MAC header stored in the ARP table as described above is appended to the IP datagram. The packet is then forwarded to the respective LAN driver (FIG. 3) and sent on to the LAN. For Ethernet 802.3 packets, the LAN header stored in the ARP table is copied into a unique buffer area. The frame length field in the LAN header is then modified to reflect the LLC/SNAP/IP datagram total length, and the header is appended to the IP datagram and forwarded to the LAN driver.

Packets received for which an entry cannot be found in the ARP table are preferably queued in the ARP table. As noted above, ARP requests in both Ethernet 802.3 and Ethernet DIX formats are then transmitted onto the LAN, i.e., assuming that the LAN comprises one of the two Ethernet formats. Any subsequent IP datagrams received from the Host prior to an ARP response being returned from the client across the LAN are also preferably queued from the ARP table entry which is "pending" the ARP response. Once an ARP response is received at the OSA adapter, all the queued packets are transmitted onto the LAN.

Figure 7:
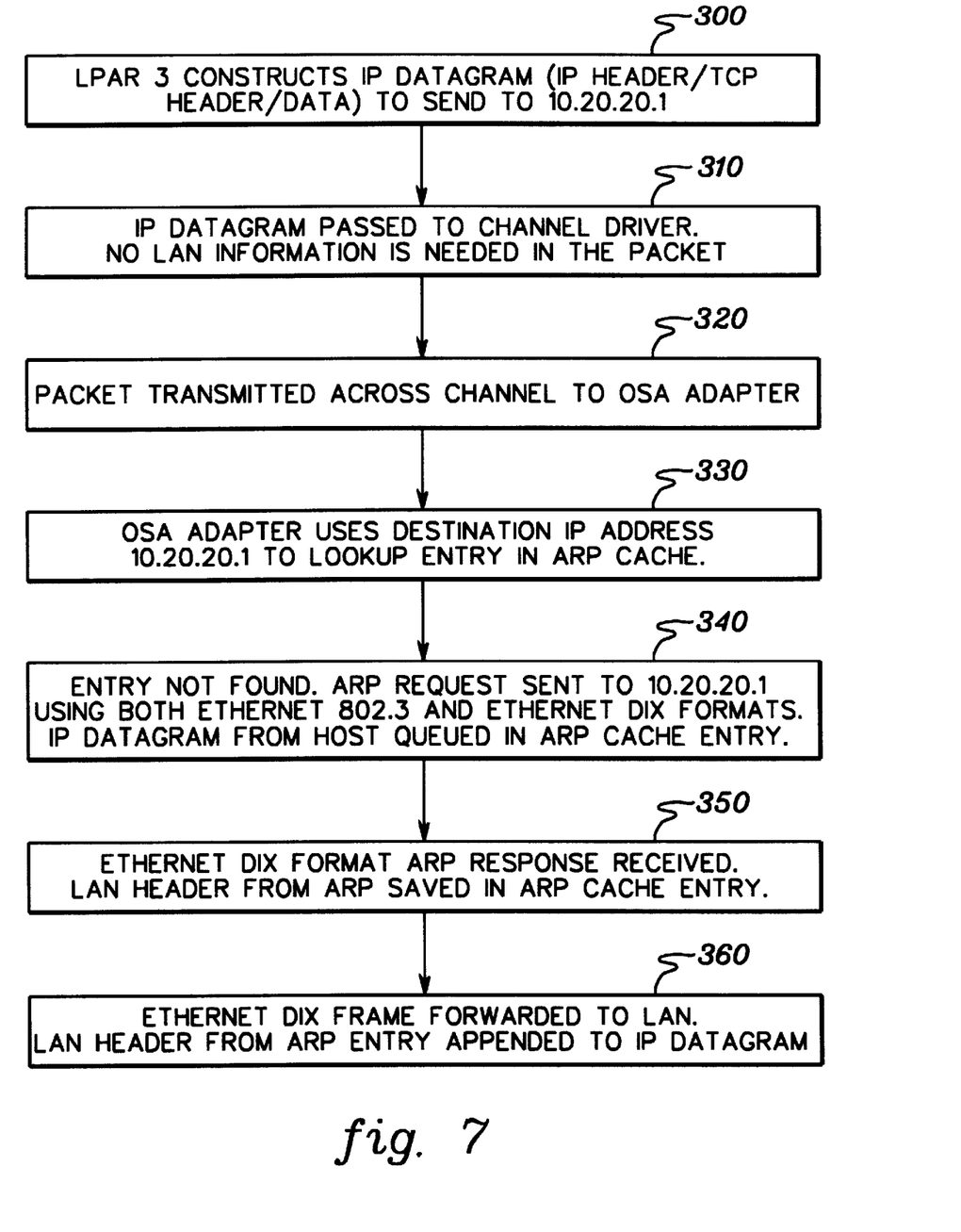
FIG. 7 is a flow diagram of communications in accordance with the present invention between a partition of the system and a client on a network coupled to the mainframe class data processing system.

FIG. 7 depicts one embodiment of LPAR to LAN communication in accordance with this aspect of the invention. A logical partition, for example, LPAR 3, constructs an IP datagram which includes an IP header, TCP header and data, for sending to an IP address, designated 10.20.20.1 300. This particular address is depicted in FIG. 3 as comprising a client coupled to LAN 1 and in FIG. 5 as being Ethernet DIX frame format.

The IP datagram is passed to the channel driver with no LAN information in the packet 310, for forwarding to the OSA adapter 320. The OSA adapter uses the destination IP address 10.20.20.1 to look up the entry in the ARP cache 330. Assuming that this is the first request to that particular address, then no entry will be found. An ARP request thus is sent to IP address 10.20.20.1 using both Ethernet 802.3 and Ethernet DIX formats. IP datagrams from the Host are queued in the ARP cache entry awaiting a response from this IP address 340. An Ethernet DIX format ARP response is assumed received and the LAN header from the ARP response is saved in the ARP cache entry 350. For example, reference FIG. 5 where in the example shown the IP address, and LAN or media header, is placed into the collision chain in a manner that will be apparent to one of ordinary skill in the art. The Ethernet DIX framed IP datagram is then forwarded to the LAN, with the LAN header from the ARP entry appended to the IP datagram received from the logical partition 360.

To summarize, by having the ARP code and the device drivers present on the OSA adapter, the Host's TCP/IP stacks are given the ability to define one IP address only and have it communicate to any LAN type through the adapter. Prior to this invention, the host system had to have one unique LAN device driver for each LAN type. Further, for Ethernet formats, one LAN device driver was needed to be loaded for Ethernet DIX connections and another for Ethernet 802.3 connections. By placing all the LAN specific drivers in the OSA adapter along with the ARP function, one IP connection can communicate to any other IP connection either LPAR to LPAR or LPAR to LAN using one generic channel device driver.

Figure 8A:
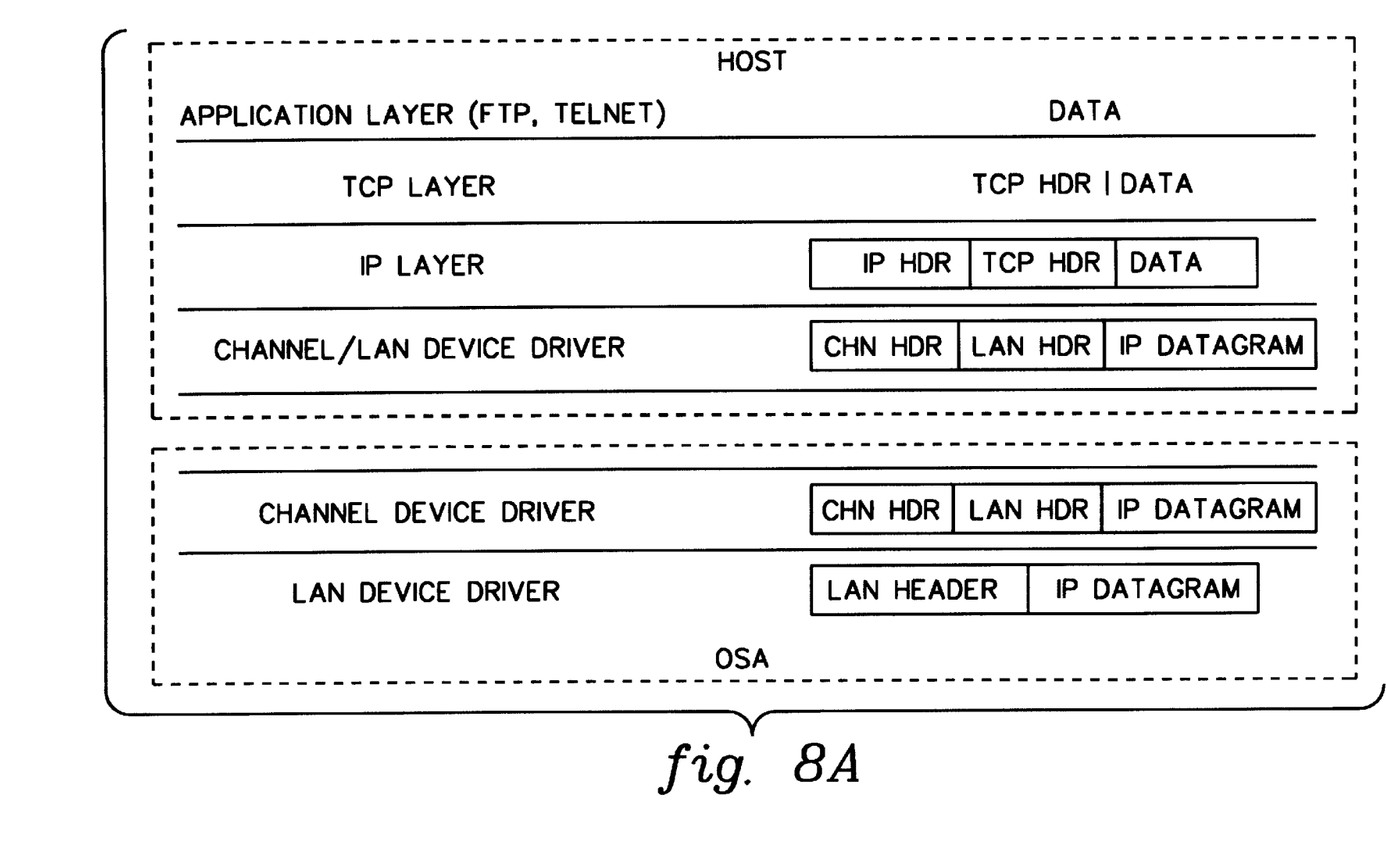
FIG. 8a is a block diagram of a conventional embodiment of the layers to be constructed for an internet protocol (IP) packet to be transmitted from a partition at the host system onto a local area network (LAN) via an adapter coupled between the host system and the network.

FIG. 8a shows the various layers involved in the constructing of a packet to be transmitted onto a LAN pursuant to conventional processing wherein the host system employs a unique LAN device driver for each LAN type to which the host is connected. The HOST contains the application, TCP, IP and channel/LAN device driver layers. The flow starts at the application layer. For example, a user issues a file transfer program (FTP) command to send a file to a client. The FTP (application) then passes the data to the TCP layer. The TCP encapsulates the FTP data with a TCP header. The TCP packet is then passed to the IP layer which encapsulates the TCP packet with an IP header. The IP header/TCP header/user data packet is known as the IP datagram. The IP datagram is then passed to the channel/LAN device driver where the IP datagram is encapsulated with a LAN header and a channel header to send the packet across, for example, an ESCON channel to an OSA adapter. In order for the LAN header to be injected at the host, the host conventionally requires knowledge of the LAN.

Once the packet is received by OSA, the channel header is stripped and the packet is passed to the LAN device driver which transmits the packet onto the proper LAN media.

Figure 8B:
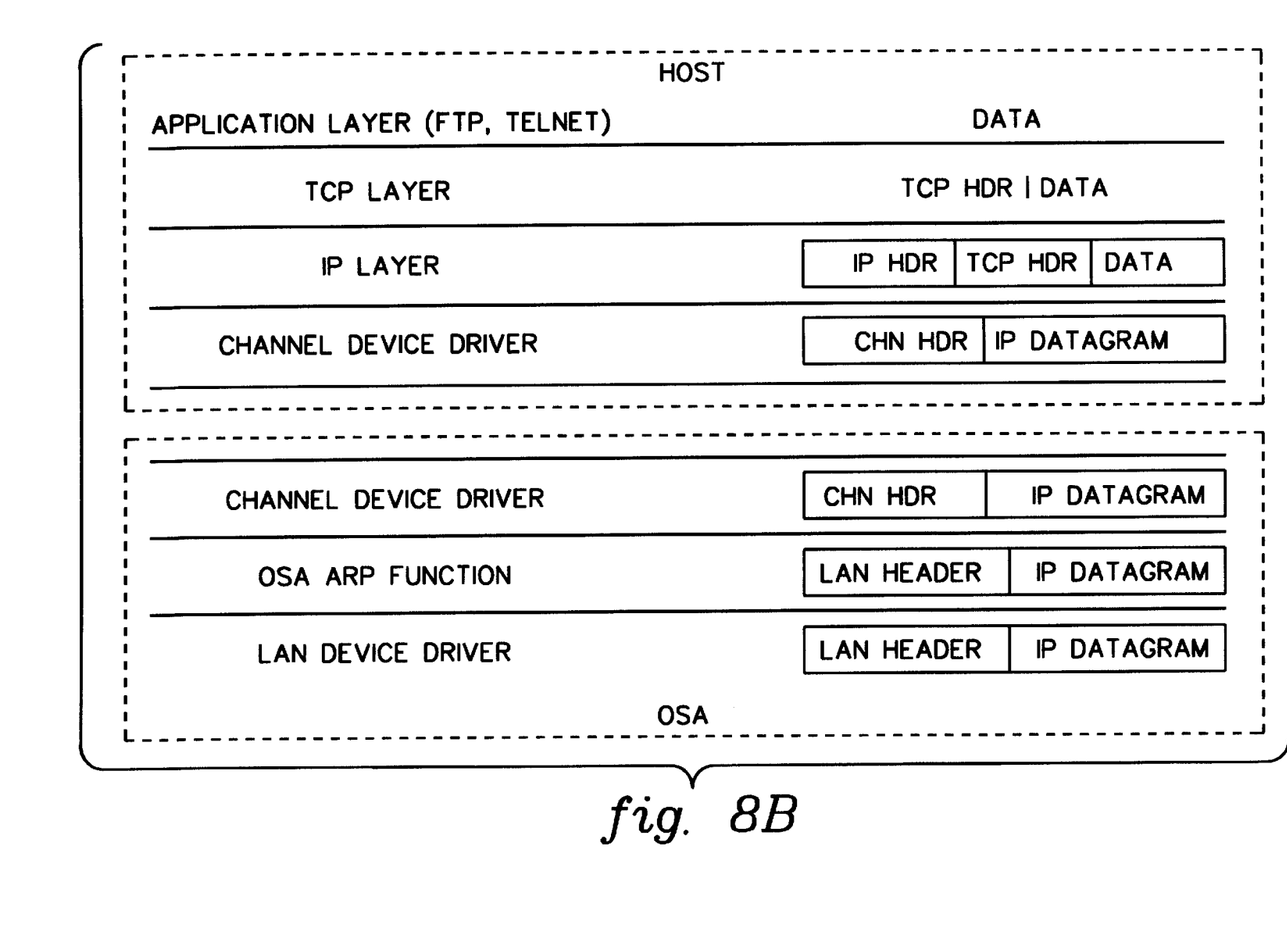
FIG. 8b is a block diagram of one embodiment of the layers to be constructed for an IP packet to be transmitted from the host system, across the adapter and onto a LAN in accordance with the present invention.

For comparison, FIG. 8b shows the various layers involved in constructing a packet to be transmitted on the LAN in accordance with the present invention. The HOST contains the application, TCP, IP and channel device driver layers. The flow starts at the application layer. For example, a user issues an FTP command to send a file to a client. The FTP (application) then passes the data to the TCP layer. TCP encapsulates the FTP data with a TCP header. The TCP packet is then passed to the IP layer which encapsulates the TCP packet with an IP header. The IP header/TCP header/user data packet is known as the IP datagram. The IP datagram is then passed to the channel device driver. The channel device driver encapsulates the IP datagram with a channel header to send the packet across the ESCON channel to the OSA adapter.

Once the packet is received by OSA, the channel header is stripped and the packet is passed to the OSA ARP function. The OSA ARP function appends the LAN header from the associated ARP cache entry to the IP datagram and passes the packet to the LAN driver. Since the ARP function constructed the entry's LAN header, the LAN driver does not need to construct a header, it just transmits the packet onto the proper LAN media.

One skilled in the art will recognize from a comparison of FIGS. 8a & 8b that the present invention relieves the host partitions of processing overhead associated with knowing the LAN configuration and moves the responsibility for providing the media header to the communications adapter.

As one further consideration, for IP networks which run in a LAN environment, the IP datagram which is transmitted must not exceed the MTU (Maximum Transmission Unit). The MTU is determined from the LAN media on which the IP datagram is being transmitted. For example, for Ethernet LANs, the maximum MTU is 1500 bytes for Ethernet DIX frames and 1492 for Ethernet 802.3 frames. Since the MTU size determines the maximum size for an IP datagram, the smaller the MTU, the more IP datagrams which must be constructed to transmit a block of data across a network. This has a direct effect on the performance of an IP connection. For LPAR to LPAR traffic, in accordance with the present invention, the IP datagrams are not sent onto the LAN environment. Therefore, for LPAR to LPAR connections, the Host configuration can specify a very large MTU (currently 64K) which will dramatically increase the performance of the IP connection.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately. Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. An article of manufacture comprising:
at least one computer usable medium having computer readable program code means embodied therein for causing network communications in a mainframe class data processing system having multiple partitions and a port to a network, the computer readable program code means in the article of manufacture comprising:
(i) computer readable program code means for causing a computer to effect receiving at a host-network interface an internet protocol (IP) datagram, said IP datagram to be routed to a client coupled to said network;
(ii) computer readable program code means for causing a computer to effect constructing a first address resolution protocol (ARP) request in a first frame format from said IP datagram and a second ARP request in a second frame format from said IP datagram;
(iii) computer readable program code means for causing a computer to effect sending both said first ARP request and said second ARP request across said network to said client;
(iv) computer readable program code means for causing a computer to effect receiving a response from said client in reply to one of said first ARP request and said second ARP request, said response indicating that said client communicates in either said first frame format or said second frame format;
(v) computer readable program code means for causing a computer to effect storing at the host-network interface an indication that said client communicates in said first frame format or said second frame format; and
(vi) computer readable program code means for causing a computer to effect using the indication stored at the host-network interface that the client communicates in the first frame format or the second frame format to subsequently format and send additional IP datagrams from the at least one partition to that client.

2. The article of manufacture of claim 1, wherein said network comprises a local area network, and said first frame format comprises an Ethernet DIX format and said second frame format comprises an Ethernet 802.3 format, and wherein said response to said host-network interface is in one of said Ethernet DIX format and Ethernet 802.3 format, said sending of said response by said client being pursuant to recognition of one of said first ARP request and said second ARP request by said client.

3. The article of manufacture of claim 2, further comprising computer readable program code means for causing a computer to effect storing at said host-network interface for future use a media header from said response of said client.

4. The article of manufacture of claim 3, wherein said IP datagram comprises a first IP datagram, and wherein said article of manufacture further comprises computer readable program code means for causing a computer to effect receiving a second IP datagram from one partition of said multiple partitions, said second IP datagram to be routed to said client coupled to said network, and computer readable program code means for causing a computer to effect sending said second IP datagram to said client of said network using said media header from said response of said client stored at said host-network interface.

5. The article of manufacture of claim 3, wherein said host-network interface comprises an ARP table, and said computer readable program code means for causing a computer to effect storing comprises computer readable program code means for causing a computer to effect saving said media header from said response of said client in said ARP table for future use in communicating with said client across said network.

6. The article of manufacture of claim 1, wherein said article of manufacture further comprises computer readable program code means for causing a computer to effect repeating for each of at least one additional client, said sending of the first ARP request and the second ARP request to the at least one additional client connected to the network, said receiving of a response thereto, said storing at the host-network interface an indication of which frame format each client of the at least one additional client communicates in, and said using the indications stored at the host-network interface to format and send future IP datagrams from the at least one partition to a selecting client of the at least one additional client.

7. An article of manufacture comprising:
   at least one computer usable medium having computer readable program code means embodied therein for causing network communications in a mainframe class data processing system having multiple partitions and a port to a network, the computer readable program code means in the article of manufacture comprising:
   (i) computer readable program code means for causing a computer to effect receiving at a host-network interface an internet protocol (IP) datagram from one partition of said multiple partitions, said IP datagram to be routed to a client coupled to said network and having no media header specified;
   (ii) computer readable program code means for causing a computer to effect dynamically determining at the host-network interface a media header for use in communicating said IP datagram to said client coupled to said network; and
   wherein said computer readable program code means for causing a computer to effect dynamically determining comprises computer readable program code means for causing a computer to effect determining whether the media header for the client is known at the host-network interface and if not, for broadcasting a request to the client and identifying the media header from a response by the client to the request.

8. The article of manufacture of claim 7, further comprising computer readable program code means for causing a computer to effect storing at said host-network interface for future use said media header from said response of said client.

9. The article of manufacture of claim 7, wherein said article of manufacture further comprises computer readable program code means for causing a computer to effect receiving a request at said host-network interface from said client coupled to said network and saving said media header of said client's request prior to receipt of said IP datagram, and wherein said computer readable program code means for causing a computer to effect dynamically determining comprises computer readable program code means for causing a computer to effect appending said media header to said IP datagram and sending said IP datagram and media header across said network to said client.

10. An article of manufacture comprising:
    at least one computer usable medium having computer readable program code means embodied therein for causing network communications in a mainframe class data processing system having multiple partitions and a port to a network, the computer readable program code means in the article of manufacture comprising:
    (i) computer readable program code means for causing a computer to effect broadcasting from a host-network interface across said network a first address resolution protocol (ARP) request in a first frame format and a second ARP request in a second frame format,
    (ii) computer readable program code means for causing a computer to effect receiving a response ARP packet at the host-network interface from a client coupled to said network responsive to said broadcasting of said first ARP request and said second ARP request, said response ARP packet including a media header defining a data format to use for an internet protocol session with said client, said data format comprising one of said first frame formats or said second frame format; and
    (iii) computer readable program code means for causing a computer to effect saving said media header at said host-network interface for appending to an IP datagram from a partition of said multiple partitions when said IP datagram is to be routed to said client.

11. The article of manufacture of claim 10, further comprising:
    computer readable program code means for causing a computer to effect receiving said IP datagram from said partition of said multiple partitions, said IP datagram to be routed to said client coupled to said network;
    computer readable program code means for causing a computer to effect retrieving said media header and appending said media header to said IP datagram; and
    computer readable program code means for causing a computer to effect sending said IP datagram and media header across said network to said client.

12. The article of manufacture of claim 10, further comprising:
    (i) computer readable program code means for causing a computer to effect generating an internet protocol (IP) datagram at one partition of the multiple partitions, said IP datagram being generated without specifying a media header for forwarding the IP datagram across the network;
    (ii) computer readable program code means for causing a computer to effect transferring said IP datagram to said host-network interface for routing to a client coupled to said network; and
    (iii) computer readable program code means for causing a computer to effect appending said media header to said IP datagram at said host-network interface for forwarding said IP datagram across said network to said client.

13. The article of manufacture of claim 12, wherein said network comprises a local area network employing a frame format comprising a token ring format, Fiber Distributed Data Interface format, Ethernet 802.3 format or Ethernet DIX format.

14. The article of manufacture of claim 12, wherein said computer readable program code means for causing a computer to effect saving comprises computer readable program code means for causing a computer to effect storing said media header in an address resolution protocol (ARP) cache at said host-network interface.

* * * * *